US012620335B2

(12) United States Patent
Kim et al.

(10) Patent No.: US 12,620,335 B2
(45) Date of Patent: May 5, 2026

(54) DISPLAY APPARATUS CORRECTING IMAGE IN CONSIDERATION OF USER'S PERCEPTUAL DISTORTION

(71) Applicant: SAMSUNG ELECTRONICS CO., LTD., Suwon-si (KR)

(72) Inventors: Jonghwan Kim, Suwon-si (KR); Guiwon Seo, Suwon-si (KR); Younghoon Jeong, Suwon-si (KR); Seungho Park, Suwon-si (KR); Youngsu Moon, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/117,235

(22) Filed: Mar. 3, 2023

(65) Prior Publication Data

US 2023/0206811 A1 Jun. 29, 2023

Related U.S. Application Data

(63) Continuation of application No. PCT/KR2021/011642, filed on Aug. 31, 2021.

(30) Foreign Application Priority Data

Sep. 3, 2020 (KR) ........................ 10-2020-0112192

(51) Int. Cl.
*G09G 3/20* (2006.01)

(52) U.S. Cl.
CPC ... *G09G 3/2003* (2013.01); *G09G 2320/0626* (2013.01); *G09G 2320/0666* (2013.01);
(Continued)

(58) Field of Classification Search
CPC ........ G09G 3/006; G09G 3/2003; G09G 3/36; G09G 3/3607; G09G 3/3611;
(Continued)

(56) References Cited

U.S. PATENT DOCUMENTS

2005/0105796 A1* 5/2005 Hong ........................ G09G 5/02 345/581
2005/0134800 A1* 6/2005 Kim .......................... H04N 9/68 351/242
(Continued)

FOREIGN PATENT DOCUMENTS

CN 103295558 A 9/2013
JP 2011-151465 A 8/2011
(Continued)

OTHER PUBLICATIONS

Written Opinion (PCT/ISA/237) dated Dec. 17, 2021 issued by the International Searching Authority in International Application No. PCT/KR2021/011642.
(Continued)

*Primary Examiner* — Ke Xiao
*Assistant Examiner* — Nelson Lam
(74) *Attorney, Agent, or Firm* — Sughrue Mion, PLLC

(57) ABSTRACT

An electronic apparatus includes a memory storing instructions and a processor configured to execute the instructions to identify a display environment of an image, correct characteristics of a test image provided to identify a user's visual perception for characteristics of the image to correspond to the identified display environment, display the test image having the corrected characteristics on a display, and correct the characteristics of the image based on the user's adjustment input for the characteristics of the displayed test image.

14 Claims, 12 Drawing Sheets

(52) U.S. Cl.
CPC ... *G09G 2354/00* (2013.01); *G09G 2360/144* (2013.01); *G09G 2370/00* (2013.01)

(58) Field of Classification Search
CPC ......... G09G 3/3622; G09G 2320/0666; G09G 2360/14; G09G 2360/141; G09G 2360/142; G09G 2360/144; G09G 2360/145; G09G 2360/147
USPC .................................................... 345/87–104
See application file for complete search history.

(56) References Cited

U.S. PATENT DOCUMENTS

| | | | | |
|---|---|---|---|---|
| 2006/0061586 | A1* | 3/2006 | Brulle-Drews | A61B 3/066 345/594 |
| 2006/0061588 | A1 | 3/2006 | Ok et al. | |
| 2006/0256127 | A1* | 11/2006 | Cho | A61B 3/066 345/591 |
| 2007/0236656 | A1* | 10/2007 | Jeong | H04N 9/68 351/159.24 |
| 2010/0188639 | A1* | 7/2010 | Carda | A61B 3/066 351/242 |
| 2010/0309217 | A1* | 12/2010 | Greenebaum | H04N 9/67 358/1.9 |
| 2011/0148904 | A1 | 6/2011 | Kotani | |
| 2013/0235073 | A1* | 9/2013 | Jaramillo | G09G 5/00 345/619 |
| 2014/0015850 | A1* | 1/2014 | Ahn | H04N 1/60 345/594 |
| 2014/0232625 | A1* | 8/2014 | Murase | G09G 3/2003 345/89 |
| 2015/0124002 | A1* | 5/2015 | Horikawa | G09G 3/3607 345/88 |
| 2015/0287370 | A1* | 10/2015 | Takanashi | G09G 3/3611 345/88 |
| 2016/0033795 | A1* | 2/2016 | Zhang | G09G 3/3648 345/89 |
| 2016/0365017 | A1* | 12/2016 | Park | G06F 3/0488 |
| 2017/0069292 | A1* | 3/2017 | Jo | G09G 3/20 |
| 2017/0324887 | A1 | 11/2017 | Min et al. | |
| 2018/0190214 | A1 | 7/2018 | Kim et al. | |
| 2018/0268754 | A1 | 9/2018 | Kim et al. | |
| 2019/0172382 | A1* | 6/2019 | Bell | G09G 3/007 |
| 2020/0105225 | A1 | 4/2020 | Greenebaum et al. | |
| 2020/0388243 | A1* | 12/2020 | Huang | G09G 5/10 |
| 2021/0287586 | A1* | 9/2021 | Hung | G09G 3/2003 |

FOREIGN PATENT DOCUMENTS

| | | | |
|---|---|---|---|
| JP | 2015-222896 | A | 12/2015 |
| KR | 10-2008-0107233 | A | 12/2008 |
| KR | 10-2011-0018542 | A | 2/2011 |
| KR | 10-2011-0049338 | A | 5/2011 |
| KR | 10-2012-0057175 | A | 6/2012 |
| KR | 10-2016-0009957 | A | 1/2016 |
| KR | 10-2016-0147194 | A | 12/2016 |
| KR | 10-2017-0030699 | A | 3/2017 |
| KR | 10-2017-0074909 | A | 6/2017 |
| KR | 10-2018-0078713 | A | 7/2018 |
| KR | 10-2018-0105401 | A | 9/2018 |
| KR | 10-2020-0009937 | A | 1/2020 |

OTHER PUBLICATIONS

International Search Report (PCT/ISA/210) dated Dec. 17, 2021 issued by the International Searching Authority in International Application No. PCT/KR2021/011642.
Extended European Search Report issued on Dec. 15, 2023 in European Application No. 21864613.1.
Office Action dated Dec. 3, 2024, issued by European Intellectual Property Office in European Patent Application No. 21864613.1.
Office Action dated Feb. 11, 2025, issued by Korean Intellectual Property Office in Korean Patent Application No. 10-2020-0112192.

* cited by examiner

DISPLAY APPARATUS CORRECTING IMAGE IN CONSIDERATION OF USER'S PERCEPTUAL DISTORTION

CROSS-REFERENCE TO RELATED APPLICATION

This application is a bypass continuation application of International Application No. PCT/KR2021/011642, filed on Aug. 31, 2021, which is based on and claims priority to Korean Patent Applications No. 10-2020-0112192 filed on Sep. 3, 2020 in the Korean Intellectual Property Office, the disclosures of which are incorporated by reference herein in their entireties.

BACKGROUND

1. Field

The disclosure relates to an electronic apparatus for processing an image signal to display an image based on the image signal and a control method thereof, and more particularly to an electronic apparatus provided to correct an image in consideration of a user's perceptual distortion and a method of controlling the same.

2. Description of Related Art

To compute and process predetermined information in accordance with certain processes, an electronic apparatus basically includes a central processing unit (CPU), a chipset, a memory, and the like electronic components for the computation. Such an electronic apparatus may be variously classified in accordance with what information will be processed and what it is used for. For example, the electronic apparatus includes an information processing apparatus such as a personal computer (PC), a server or the like for processing general information; an image processing apparatus for processing image data; an audio apparatus for audio process; home appliances for miscellaneous household chores; etc. The image processing apparatus may be classified into an apparatus with a display panel for displaying an image (i.e., a display apparatus), and an apparatus with no display panel. The display apparatus processes an image signal from an image source and displays the image signal on its own display panel, and the image processing apparatus with no display panel outputs a processed image signal to a display apparatus so that an image can be displayed on the display apparatus.

Such a displayed image may have factors that decrease a user's correct perception. For example, there is a color washout phenomenon that the higher the brightness a user visually perceives, the lower the saturation of an image the user perceives. Further, users have different unique abilities to perceive an image. For this reason, even when users view an image displayed on the same display apparatus and under the same surrounding environment, the color of the image may be perceived differently by the users. In other words, due to various factors involved in a user's visual perception of an image, the image perceived by the user may be distorted.

Accordingly, an image processing apparatus or a display apparatus may be required to reduce such a distortion in perceiving an image, and ensure that the image of which the characteristics (e.g., color, etc.) are intended by an image content provider is conveyed to a user as it is as possible.

SUMMARY

According to an aspect of the disclosure, an electronic apparatus includes a memory storing instructions and a processor configured to execute the instructions to identify a display environment of an image, correct characteristics of a test image provided to identify a user's visual perception for characteristics of the image to correspond to the identified display environment, display the test image having the corrected characteristics on a display, and correct the characteristics of the image based on the user's adjustment input for the characteristics of the displayed test image.

The display environment may include at least one of display brightness of the display or ambient brightness, and the processor may be further configured to execute the instructions to correct the characteristics of the test image based on at least one of the display brightness or the ambient brightness.

The processor may be further configured to execute the instructions to correct saturation for each color of the test image.

The processor may be further configured to execute the instructions to identify a first correction value in proportion to at least one of the display brightness or the ambient brightness, and reflect the first correction value in a value of the characteristics of the test image.

The electronic apparatus may further include an interface configured to receive an image signal, in which the processor may be further configured to execute the instructions to correct the characteristics of the image by reflecting the first correction value and a second correction value corresponding to the adjustment input in color information of the image signal received through the interface.

The processor may be further configured to execute the instructions to reflect a third correction value which is in inverse proportion to the first correction value, in brightness information of the image signal received through the interface.

The processor may be further configured to execute the instructions to calculate the first correction value based on a correction value corresponding to the display brightness and a correction value corresponding to the ambient brightness.

The processor may be further configured to execute the instructions to calculate the first correction value a first weight given to the correction value corresponding to the display brightness and a second weight given to the correction value corresponding to the ambient brightness, the first weight being different from the second weight.

The electronic apparatus may further include an interface configured to receive an image signal, in which the processor may be further configured to execute the instructions to identify a second correction value based on the adjustment input and correct the characteristics of the image by reflecting the second correction value in color information of the image signal received through the interface.

The test image may include a plurality of split areas having a same color, in which an area among the plurality of split areas is different in saturation from other areas among the plurality of split areas, and the processor may be configured to measure the user's score for the color based on whether the area different in saturation is correctly selected by the adjustment input, and derive the second correction value based on the measured score.

The memory may be configured to store a second correction value corresponding to a user and the processor may be configured to acquire the second correction value stored in the memory, and adjust the second correction value based on a difference between the display environment at a point in time in which the second correction value is derived and the display environment at a current point in time.

According to an aspect of the disclosure, a method of controlling an electronic apparatus includes identifying a display environment of an image, correcting characteristics of a test image provided to identify a user's visual perception for characteristics of the image to correspond to the identified display environment, displaying the test image having the corrected characteristics on a display, and correcting the characteristics of the image based on the user's adjustment input for the characteristics of the displayed test image.

The display environment may include at least one of display brightness of the display or ambient brightness, and the correcting the characteristics of the test image may include correcting the characteristics of the test image based on at least one of the display brightness or the ambient brightness.

The correcting the characteristics of the image may include correcting saturation for each color of the test image.

The correcting the characteristics of the test image may include identifying a first correction value in proportion to at least one of the display brightness or the ambient brightness, and reflecting the first correction value in a value of the characteristics of the test image.

The identifying the first correction value may include calculating the first correction value based on a correction value corresponding to the display brightness and a correction value corresponding to the ambient brightness.

The calculating the first correction value may include calculating the first correction value based on a first weight given to the correction value corresponding to the display brightness and a second weight given to the correction value corresponding to the ambient brightness, the first weight being different from the second weight.

The correcting the characteristics of the image may include obtaining color information of an image signal, identifying a second correction value based on the adjustment input, and adjusting the color information of the image signal based on the first correction value and the second correction value The correcting the characteristics of the image may include identifying a second correction value based on the adjustment input, and correcting the characteristics of the image based on the second correction value.

According to an aspect of the disclosure, a non-transitory computer-readable recording medium includes a program for executing the method of controlling the electronic apparatus.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Below, embodiments will be described in detail with reference to accompanying drawings. Further, the embodiments described with reference to the accompanying drawings are not exclusive to each other unless otherwise mentioned, and a plurality of embodiments may be selectively combined within one apparatus. The combination of these plural embodiments may be discretionally selected and applied to realize the present inventive concept by a person having an ordinary skill in the art.

In the description of the embodiments, an ordinal number used in terms such as a first element, a second element, etc. is employed for describing variety of elements, and the terms are used for distinguishing between one element and another element. Therefore, the meanings of the elements are not limited by the terms, and the terms are also used just for explaining the corresponding embodiment without limiting the disclosure.

Further, a term "at least one" among a plurality of elements in the disclosure represents not only all the elements but also each one of the elements, which excludes the other elements or all combinations of the elements. For example, the expression, "at least one of a, b, or c," should be understood as including only a, only b, only c, both a and b, both a and c, both b and c, or all of a, b, and c.

Figure 1:
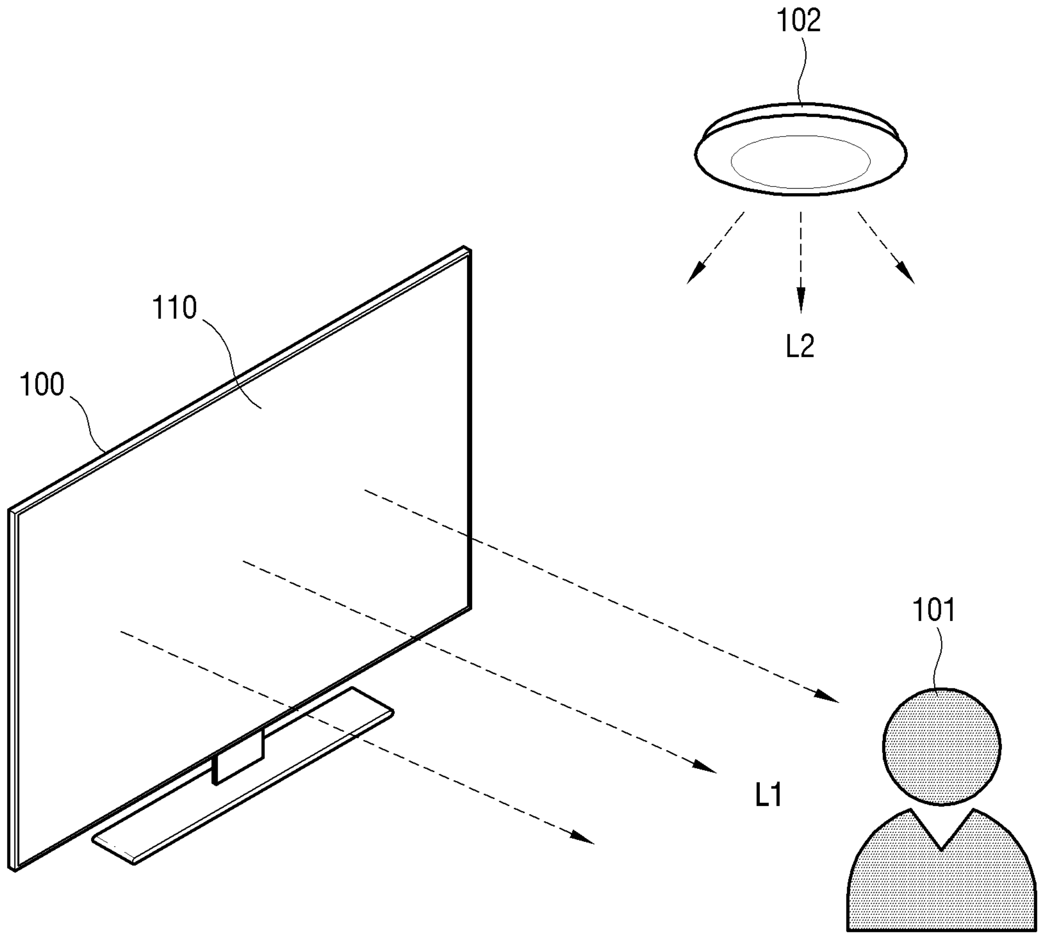
FIG. 1 illustrates an electronic apparatus according to an embodiment.

FIG. 1 illustrates an electronic apparatus according to an embodiment.

As shown in FIG. 1, the electronic apparatus 100 according to an embodiment is implemented as a display apparatus with a display 110. However, embodiments of the disclosure are not necessarily limited only to the display apparatus, and may also be applied to an image processing apparatus that processes an image signal without the display 110 and outputs the processed image signal to a separate display apparatus. The electronic apparatus 100 may be implemented by various kinds of apparatuses, for example, TV, a monitor, a digital signage, an electronic blackboard, an electronic picture frame, a video wall and the like stationary display apparatus; a smartphone, a tablet device, a portable multimedia player, and the like mobile device; a wearable device; a set-top box, a relay device, an optical media player, and the like image processing apparatus; and so on.

An image displayed on the display 110 by the electronic apparatus 100 is perceived by a user 101. In this case, the user's visual perception of an image largely depends on both the display environment of the image and the perceptual ability of the user 101. Here, the display environment of the image includes an apparatus environment of the electronic apparatus 100 and a surrounding environment of the electronic apparatus 100. For example, the image perceived by the user 101 is affected by light L1 emitted from the display 110 and ambient light L2. The image perceived by the user 101 may be affected by three factors such as the apparatus characteristics of the electronic apparatus 100, the characteristics of the surrounding environment where the electronic apparatus 100 is installed, and the perceptual characteristics of the user 101 who perceives the image.

The apparatus characteristics of the electronic apparatus 100 may for example include the brightness of the display 110 displaying an image. When the user 101 perceives an image displayed on the display 110, the intensity of saturation (or saturation) perceived by the user 101 is varied depending on the brightness of the display 110. For example, when the same color image is displayed on two displays 110 different in brightness, the user 101 usually feels that the saturation of the image displayed on the display 110 having relatively high brightness is low. Such a situation may occur frequently as the limit of the maximum brightness that the display 110 can express is gradually increasing.

The characteristics of the surrounding environment where the electronic apparatus 100 is installed may for example include the brightness of an environment where the user 101 views the image of the electronic apparatus 100. As an example, when there is a light 102 in a room where the electronic apparatus 100 is placed, the user 101 perceives the saturation of the image in a state that the light 102 is turned on and the saturation of the image in a state that the light 102 is turned off differently. While the user 101 is viewing the image, the intensity of the perceived saturation is varied depending on the brightness of the surrounding environment. Like the brightness of the display 110 described above, the higher the brightness of the ambient light, the lower the saturation of the image that the user 101 perceives.

The perceptual characteristics of the user 101 may for example refer to that the user 101 perceives the characteristics of the image differently according to his/her subjective senses. For example, when two users 101 are viewing an image displayed on the display 110 emitting light quantity L1 under a surrounding environment of ambient light L2, the two users 101 may perceive the color or saturation of the image differently.

The electronic apparatus 100 according to an embodiment of the disclosure takes all of such characteristics into account, thereby operating to minimize the distortion of the image perceived by the user 101. In this regard, details will be described later.

Figure 2:
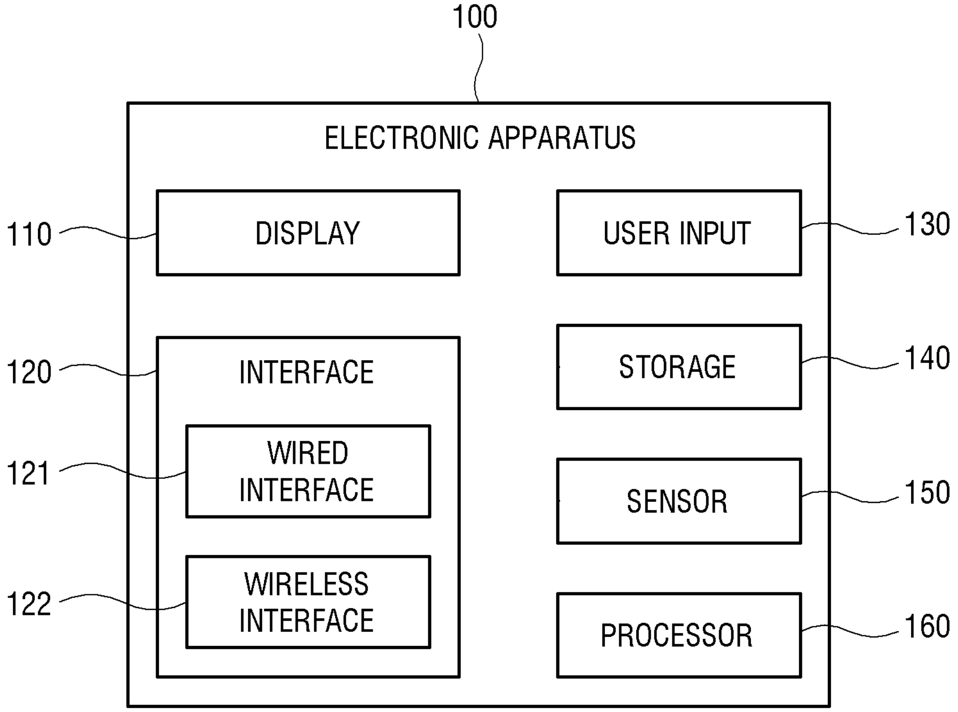
FIG. 2 is a block diagram of an electronic apparatus according to an embodiment.

FIG. 2 is a block diagram of an electronic apparatus according to an embodiment.

As shown in FIG. 2, the electronic apparatus 100 includes various hardware elements necessary for operations. The elements included in the electronic apparatus 100 are not limited to this example, and may further include additional elements or exclude some elements from this example as necessary when the electronic apparatus 100 is implemented. For example, when the electronic apparatus 100 does not include the display 110, an interface 120 may be provided to output an image signal to another display apparatus.

The electronic apparatus 100 may include the display 110, the interface 120, a user input 130, a storage (or memory) 140, a sensor 150 and a processor 160. The display 110 includes a display panel capable of displaying to an image on a screen. The display panel is provided as a light receiving structure such as a liquid crystal display or a self-emissive structure such as an organic light emitting diode (OLED). The display 110 may further include an additional element according to the structures of the display panel. For example, when the display panel is a liquid crystal type, the display 110 includes a liquid crystal display panel, a backlight unit for emitting light, a panel driving substrate for driving the liquid crystal of the liquid crystal display panel.

The interface 120 includes an interface circuit through which the electronic apparatus 100 performs communication to transmit and receive data to and from various types of external apparatuses. The interface 120 is provided to perform communication with a plurality of external apparatuses. For example, the interface 120 includes a plurality of communication units, and may use one communication unit to communicate with a plurality of external apparatuses or may use different communication units to communicate with the plurality of external apparatuses, respectively.

The interface 120 may include one or more wired interfaces 121 for wired communication connection. The wired interface 121 may include a connector or port to which a cable of a pre-defined transmission standard is connected. For example, the wired interface 121 includes a port connecting with a terrestrial or satellite antenna to receive a broadcast signal or connecting with a cable for cable broadcasting. Further, the wired interface 121 include ports to which cables of various wired transmission standards such as high-definition multimedia interface (HDMI), DisplayPort (DP), digital video interactive (DVI), component, composite, S-video, thunderbolt, and the like to connect with various image processing apparatuses. Further, the wired interface 121 includes a port of a universal serial bus (USB) standard to connect with a USB device. Further, the wired interface 121 includes an optical port to which an optical cable is connected. Further, the wired interface 121 includes an audio input port to which an external microphone is connected, and an audio output port to which a headset, an earphone, a loudspeaker etc. is connected. Further, the wired interface 121 includes an Ethernet port connected to a gateway, a router, a hub, etc. for connection with a wide area network (WAN).

The interface 120 may include one or more wireless interfaces 122 for wireless communication connection. The wireless interface 122 includes an interactive communication circuit including at least one of elements such as a communication module, a communication chip, etc. corresponding to various kinds of wireless communication protocols. For example, the wireless interface 122 includes a Wi-Fi communication chip for wireless communication with an access point (AP) based on Wi-Fi; a communication chip for wireless communication based on Bluetooth, Zigbee, Z-Wave, Wireless HD, wireless gigabits (WiGig), near field communication (NFC), etc.; an infrared (IR) module for IR communication; a mobile communication chip for mobile communication with a mobile device; etc.

The user input 130 includes a circuit related to various kinds of input interfaces to be controlled by a user to thereby receive a user's input. The user input 130 may be variously configured according to the kinds of electronic apparatus 100, and may for example include a mechanical or electronic button of the electronic apparatus 100, a touch pad, a sensor, a camera, a touch screen installed in the display 110, a remote controller separated from the main body of the electronic apparatus 100, etc.

The electronic apparatus 100 may further include a microphone to collect a user's voice and generate an audio signal. The microphone may be provided in the main body of the electronic apparatus 100, or may be provided in the remote controller separated from the electronic apparatus 100. When the microphone is provided in the remote controller, the remote controller converts the audio signal received through the microphone into a carrier signal for wireless transmission and transmits the carrier signal to the wireless interface 122.

A means for inputting a user's voice to the electronic apparatus 100 is not limited to the microphone provided in the electronic apparatus 100, and the voice may be input through a separate external apparatus communicating with the electronic apparatus 100. For example, when the electronic apparatus 100 is a television (TV), a TV control application may be installed in a smartphone, a tablet device and the like mobile device to control operations of the electronic apparatus 100 through the mobile device. Here, when the TV supports a voice recognition function, the TV control application is provided to process an audio signal corresponding to a user's voice. When the mobile device is provided with the microphone, the mobile device may receive a user's voice through its own microphone while the TV control application is activated. The mobile device converts the received audio signal of the user's voice into a carrier signal and transmits the carrier signal to the wireless interface 122.

The external apparatus is not limited to the mobile device, and may include various types of electronic apparatuses such as an artificial intelligence (AI) loudspeaker, which can be stationary or portable, and provided to install and execute the TV control application therein.

The storage 140 is configured to store digitalized data. The storage 140 may include a nonvolatile storage in which data is retained regardless of whether power is supplied or not, and a volatile memory in which data loaded to be processed by a processor 160 is retained only when power is supplied. The storage may include a flash memory, a hard disc drive (HDD), a solid-state drive (SSD), a read only memory (ROM), etc., and the memory includes a buffer, a random-access memory (RAM), etc. The storage 140 according to an embodiment may for example be configured to store a user account of the electronic apparatus 100, and the manufacturer, brand, device information, etc. of the electronic apparatus 100.

The storage 140 according to an embodiment may for example be configured to store data of a predefined test image. The test image is prepared in advance to identify a user's visual perception with respect to predetermined characteristics of an image displayed on the display 110, and stored in the storage 140. However, the data of the test image is not necessarily stored in the storage 140, and the electronic apparatus 100 may receive the data of the test image through the interface 120 as necessary.

The sensor 150 detects the light quantity or brightness of the surrounding environment of the electronic apparatus 100 and transmits the detected light quantity or brightness to the processor 160. For example, the sensor 150 includes a photosensor, a camera, etc. However, a method by which the processor 160 obtains information about the brightness of the surrounding environment is not limited only to the sensor 150. The electronic apparatus 100 may be configured not to include the sensor 150, and may receive the information about the brightness of the surrounding environment through the interface 120.

The processor 160 may include one or more hardware processors achieved by a central processing unit (CPU), a chipset, a buffer, a circuit, etc. which are mounted on a printed circuit board (PCB). Alternatively, the processor 160 may be configured as a system on chip (SoC). When the electronic apparatus 100 is implemented as a display apparatus, the processor 160 may include modules corresponding to various processes of a demultiplexer, a decoder, a scaler, an audio digital signal processor (DSP), an amplifier, etc. to display an image based on image content. Here, some or all of such modules may be achieved by the SoC. For example, the demultiplexer, the decoder, the scaler, and the like module related to an image process may be implemented as an image processing SoC, and the audio DSP may be implemented as a chipset separated from the SoC.

The processor 160 according to an embodiment performs operations to minimize a user's perceptual distortion with respect to the characteristics of an image displayed on the display 110. Below, such operations will be described.

Figure 3:
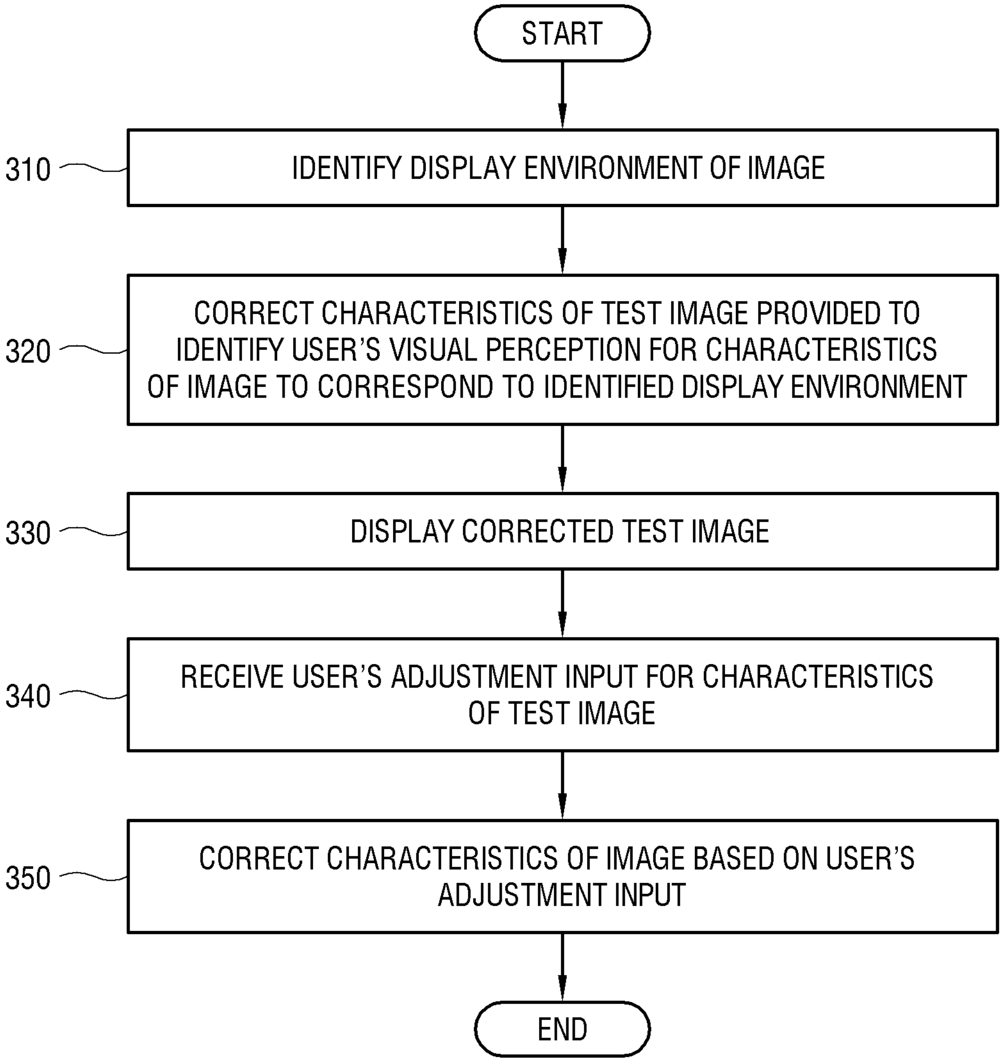
FIG. 3 is a flowchart showing a method of controlling an electronic apparatus according to an embodiment.

FIG. 3 is a flowchart showing a method of controlling an electronic apparatus according to an embodiment.

As shown in FIG. 3, the following operations are performed by the processor 160 (see FIG. 2) of the electronic apparatus 100 (see FIG. 2).

In operation 310, the electronic apparatus identifies a display environment of an image. The display environment of the image may for example include the brightness of the display 110 (see FIG. 2) of the electronic apparatus, and the brightness of the surrounding environment of the electronic apparatus. On the other hand, when the electronic apparatus is configured to output an image signal to another display apparatus to display an image, the display environment of the image may include the display brightness provided in the another display apparatus.

In operation 320, the electronic apparatus corrects the characteristics of a test image provided to identify a user's visual perception for the characteristics of the image to correspond to the display environment. The characteristics of the image may for example include the color, the saturation, etc. of the image.

In operation 330, the electronic apparatus displays the corrected test image. When the electronic apparatus includes the display, the electronic apparatus displays the test image on its own display. On the other hand, when the electronic apparatus includes no display, the corrected test image is output to and displayed on another display apparatus.

In operation 340, the electronic apparatus receives a user's input for adjusting the characteristics of the displayed test image. The electronic apparatus receives the user's input through the user input 130 (see FIG. 2). On the other hand, when the test image is being displayed on another display apparatus and the other display apparatus includes a user input, the electronic apparatus may receive a signal corresponding to the user's input for the adjustment from the other display apparatus.

In operation 350, the electronic apparatus corrects the characteristics of the image based on the user's input received for the adjustment. When the electronic apparatus includes the display, the electronic apparatus displays the corrected image on its own display. On the other hand, when the electronic apparatus includes no display, an image signal corresponding to the corrected image is output to and displayed on another display apparatus.

In this way, the electronic apparatus minimizes a user's perceptual distortion with respect to the characteristics of the displayed image, thereby ensuring that the image of which the characteristics (e.g., color, etc.) are intended by an image content provider is conveyed to the user as it is as possible.

The foregoing operations may be performed by the electronic apparatus alone. However, the foregoing operations may be divided into a plurality of steps and allocated to the electronic apparatus and a separate apparatus (e.g., a server) communicating with the electronic apparatus within a system. As an example, the electronic apparatus may perform only basic input/output operations, and the server, which has higher system resource availability than the electronic apparatus, may perform analysis and correction based on the input/output content received from the electronic apparatus and transmit analysis and correction results to the electronic apparatus. In this embodiment, the electronic apparatus receives a user's input (i.e., the operation 340) and displays the test image (i.e., the operation 330), and the server performs identification and correction operations (i.e., the operations 310, 320 and 350) and transmits the results to the electronic apparatus. In this case, the identification and correction operations are performed in the server, and only the operations of transmitting input information to the server or outputting the results received from the server are performed in the electronic apparatus.

Specifically, in the operation 310, the server identifies the display environment of the image in the electronic apparatus based on surrounding environment information received from the electronic apparatus. The electronic apparatus may be configured to perform the operation 310, and the electronic apparatus in this case transmits information obtained by identifying the display environment of the image to the server.

In the operation 320, the server corrects the characteristics of the test image to correspond to the identified display environment, and transmits a correction result to the electronic apparatus.

In the operation 330, the electronic apparatus displays the test image corrected based on the correction result received from the server. Here, the electronic apparatus may receive an offset value for correcting the test image from the server in a state that the test image is stored in advance, and correct the test image by itself, or may receive data of the test image corrected by the server and display the test image as it is.

In the operation 340, the electronic apparatus receives the user's input for adjusting the characteristics of the test image and transmits the user's input to the server.

In the operation 350, the server corrects the characteristics of the image based on a user's adjustment input received from the electronic apparatus, and transmits the correction result to the electronic apparatus. Thus, the electronic apparatus can correct the characteristics of the image based on the correction result received from the server and display the corrected image.

Below, an embodiment where the electronic apparatus corrects the characteristics of the image will be described in detail.

Figure 4:
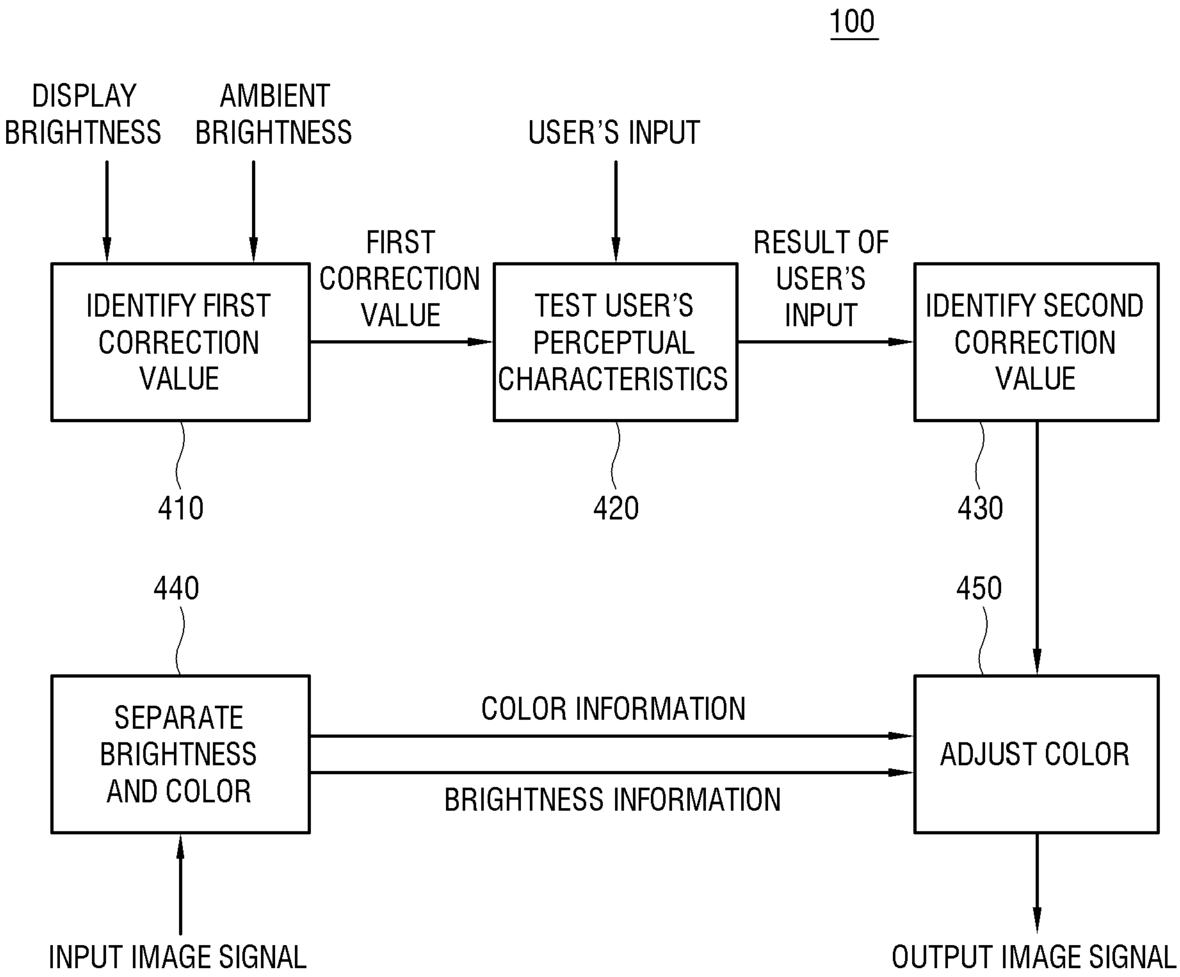
FIG. 4 is a block diagram showing an electronic apparatus correcting the characteristics of an image according to an embodiment.

FIG. 4 is a block diagram showing an electronic apparatus correcting the characteristics of an image according to an embodiment.

As shown in FIG. 4, the electronic apparatus 100 performs operation 410 to identify a first correction value. The operation 410 corresponds to the foregoing operations 310 and 320 of FIG. 3. The electronic apparatus 100 obtains two parameters such as the display brightness and the ambient brightness at the current point in time. The electronic apparatus 100 identifies the first correction value corresponding to the two obtained parameters. There are multiple methods of identifying the first correction value. For example, the first correction value corresponding to the two parameters may be retrieved from a database (DB) or a table based on previously performed test data or simulation data, or the first correction value may be calculated as a value resulting from applying the two parameters to a predefined equation or function.

The first correction value is, but not limited to, a value related to one of various characteristics with which an image is displayed. As one of various examples, it will be described that the first correction value in this embodiment is an offset value for saturation in a predetermined color.

The electronic apparatus 100 performs operation 420 of testing a user's perceptual characteristics. The operation 420 corresponds to the foregoing operations 330 and 340 of FIG. 3. The electronic apparatus 100 displays a test image prepared in advance so as to be provided to a user, in which the first correction value identified in the operation 410 is reflected in the test image. A default value about how to display the test image is defined in the electronic apparatus 100. For example, when a test image for a predetermined color is displayed, a level of saturation for the test image is set as the default value. In this regard, the electronic apparatus 100 adjusts the default value based on the first correction value, thereby displaying the test image with the adjusted saturation. In this way, a user views the test image adjusted to correspond to the display brightness and the ambient brightness.

In the operation 420 of testing a user's perceptual characteristics, the electronic apparatus 100 receives the user's input for adjusting the characteristics of the displayed test image, for example, a user's input for adjusting the saturation of the test image for each color. The user's input method may be varied depending on implementation methods of the test image, and examples thereof may be variously given according to design methods. In this regard, details will be described later.

The electronic apparatus 100 performs operation 430 of identifying a second correction value. By reflecting the results of receiving a user's input for the adjustment in the operation 420 of testing a user's perceptual characteristics, the electronic apparatus 100 identifies the second correction value. While the first correction value is a correction value for the test image displayed in the operation 420 of testing a user's perceptual characteristics, the second correction value is a correction value for an image to be displayed by the electronic apparatus 100 (or an image for processing to be displayed on another display apparatus). The second correction value may be set as an image value for various characteristics, for example, a saturation offset value for a predetermined color of an image.

The electronic apparatus 100 performs operation 440 of separating the brightness and the color. The electronic apparatus 100 obtains color information and brightness information from a predetermined input image signal. An input image signal may have various formats, for example, RGB, YCbCr, CIE Lab, hue-saturation-value (HSV), CIE-CAM02, etc. For example, when the input image signal is given in the format of YCbCr, the electronic apparatus 100 separates Y, i.e., the brightness information, and Cb and Cr, i.e., the color information.

The electronic apparatus 100 performs operation 450 of adjusting a color. The operation 430 of identifying the second correction value and the operation 450 of adjusting a color corresponds to the foregoing operation 350 of FIG.

3. The electronic apparatus 100 performs the adjustment by reflecting the second correction value in the color information of the input image signal, and combines the adjusted color information and the brightness information into an output image signal. The output image signal is a result of correcting the input image signal by considering all of the display brightness, the ambient brightness and a user's perceptual characteristics. The brightness information may not be adjusted, or may be set to reflect a separate adjusting method.

In the foregoing embodiment, the electronic apparatus 100 obtains two parameters such as the display brightness and the ambient brightness at the current point in time in the operation 410 of identifying the first correction value, and identifies the first correction value corresponding to the two obtained parameters. However, the first correction value is not necessarily limited to all the two parameters. Alternatively, the electronic apparatus 100 may be configured to obtain any one of two parameters, i.e., the display brightness or the ambient brightness at the current point in time, and identify the first correction value corresponding to the obtained parameter. The operations after identifying the first correction value are the same as those described above.

Meanwhile, additional adjustment may be performed between the operation 440 of separating the brightness and the color and the operation 450 of adjusting the color. Below, such an embodiment will be described.

Figure 5:
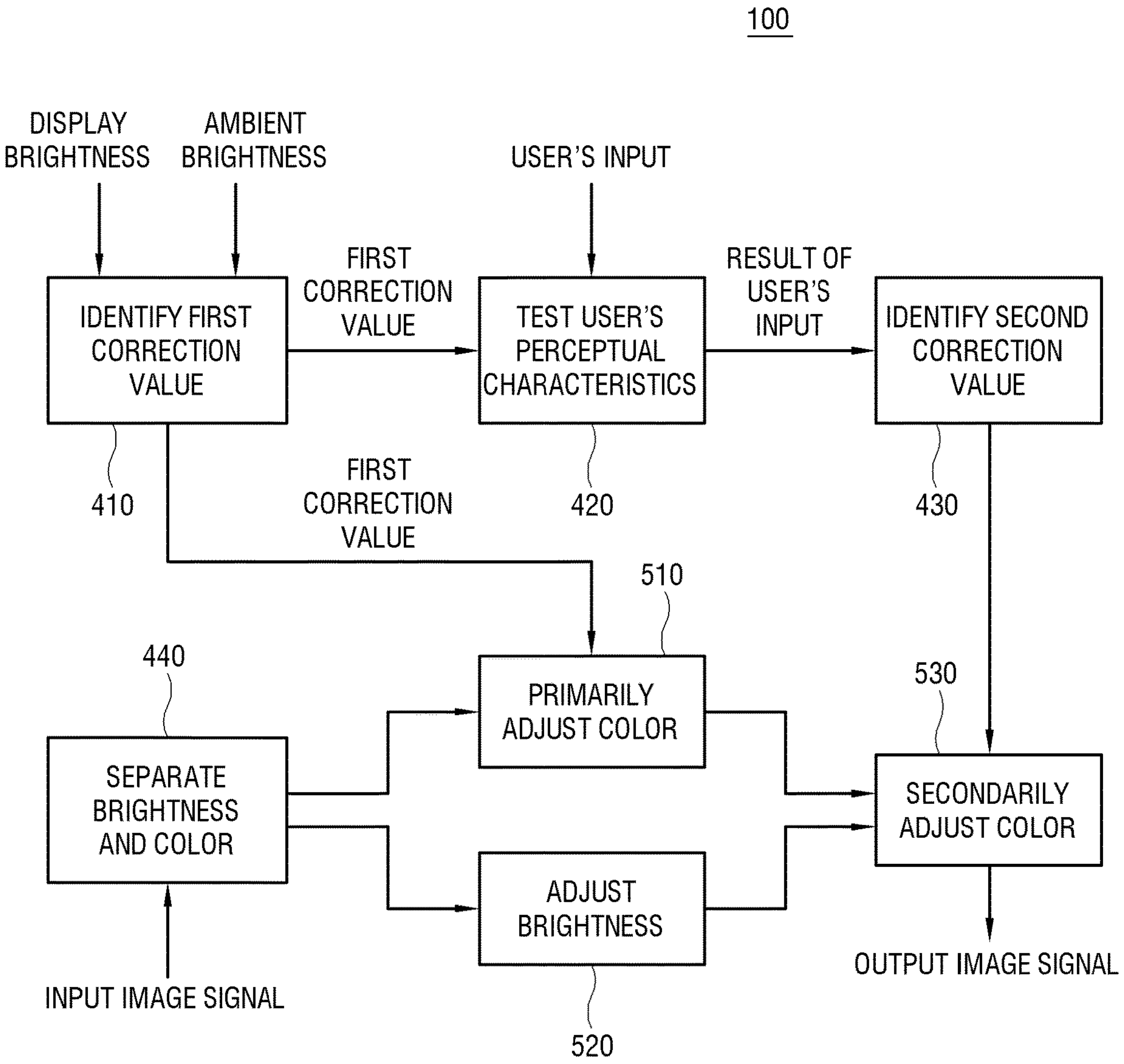
FIG. 5 is a block diagram showing an electronic apparatus correcting the characteristics of an image according to an embodiment.

FIG. 5 is a block diagram showing an electronic apparatus correcting the characteristics of an image according to an embodiment.

As shown in FIG. 5, the electronic apparatus 100 converts an input image signal into an output image signal while correcting the characteristics of the image. Here, the operation 410 of identifying the first correction value, the operation 420 of testing a user's perceptual characteristics, the operation 430 of identifying the second correction value, and the operation 440 of separating the brightness and the color are substantially the same as those of the embodiment shown in FIG. 4, and thus detailed descriptions thereof will be omitted. However, the first correction value identified in the operation 410 of identifying the first correction value is used in not only the operation 420 of testing a user's perceptual characteristics but also operation 510 of primarily adjusting the color.

The electronic apparatus 100 performs the operation 510 of primarily adjusting the color. The electronic apparatus 100 corrects color information about an input image signal based on the first correction value. When a first correction value of $\text{Gain}_{percept}$ and the color information about the input image signal having saturation of $\text{Cb}_{in}$ and $\text{Cr}_{in}$ for a certain color are given, the corrected saturation $\text{Cb}_{out}$ and $\text{Cr}_{out}$ is as follows.

$$Cb_{out}=Cb_{in}*\text{Gain}_{percept}$$

$$Cr_{out}=Cr_{in}*\text{Gain}_{percept}$$

In the foregoing equations, "*" may indicate a multiplication symbol, or may indicate an operation symbol having various mathematical meanings. In this way, the electronic apparatus 100 primarily adjusts the color information about the input image signal based on the display brightness and the ambient brightness.

The electronic apparatus 100 performs operation 520 of adjusting the brightness. The operation 520 of adjusting the brightness is applied to minimize the side effects of increasing the brightness of the image, which may occur in the operation 510 of primarily adjusting the color. The operation 520 of adjusting the brightness may be designed not to be carried out when it is identified that the side effects are insignificant, thereby maintaining the brightness information about the input image signal without the adjustment. When a correction value of $\text{Gain}_{compress}$ for the side effects of increasing the brightness, and the brightness information $Y_{in}$ about an input image signal, and the brightness information $Y_{out}$ about an output image signal are given, they satisfy the following relationship.

$$Y_{out}=Y_{in}*\text{Gain}_{compress}$$

The correction value $\text{Gain}_{compress}$ is varied depending on the first correction value $\text{Gain}_{percept}$, and is in inverse proportion to the first correction value, thereby preventing the brightness from excessively increasing due to increase in the saturation.

The electronic apparatus 100 performs operation 530 of secondarily adjusting the color. The electronic apparatus 100 applies the second correction value to the saturation of a predetermined color in the color information about the input image signal to which the operation 510 of primarily adjusting the color is applied. When the input image signal has a color $\text{Hue}_{in}$, and a color $\text{Hue}_{percept}$ in which the second correction value is reflected are given, the color $\text{Hue}_{out}$ of the output image signal is as follows.

$$\text{Hue}_{out}=\text{Hue}_{in}+\text{Hue}_{percept}$$

The electronic apparatus 100 combines the brightness information with the color information adjusted as above, thereby converting the input image signal into the output image signal.

Below, a method of identifying the first correction value will be described.

Figure 6:
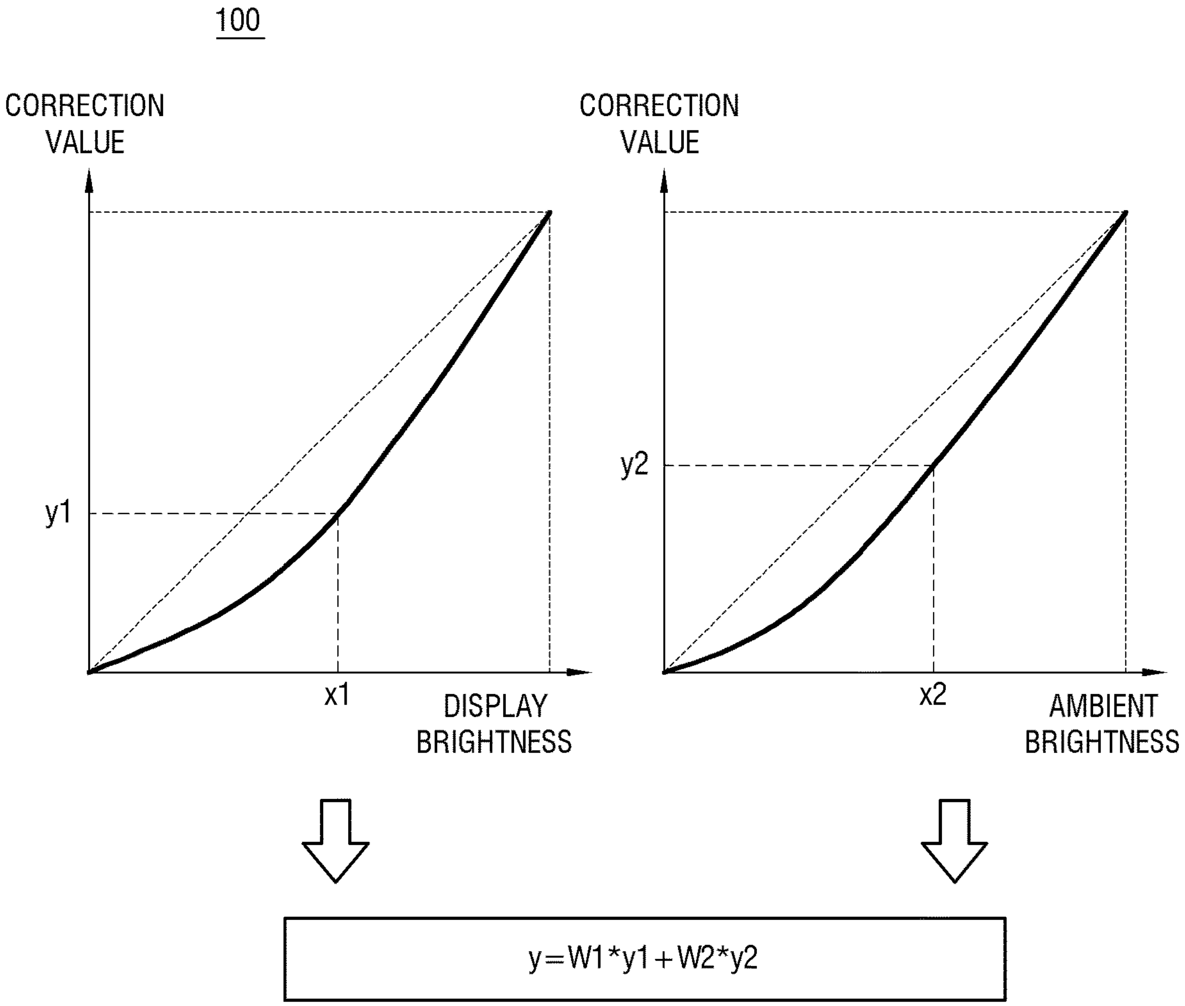
FIG. 6 is a diagram illustrating a principle of identifying a first correction value.

FIG. 6 illustrates a principle of identifying a first correction value.

As shown in FIG. 6, the first correction value is derived based on two parameters, i.e., the display brightness and the ambient brightness. In FIG. 6, the graph on the left side shows an example of a curve corresponding to the display brightness and the correction value, and the graph on the right side shows an example of a curve corresponding to the ambient brightness and the correction value. In this embodiment, the graphs show the correction values respectively corresponding to the display brightness and the ambient brightness, but this is merely an example. The correction value corresponding to each of the display brightness or the ambient brightness may be defined in advance in various forms such as an equation, a function, and a table.

The curves in the two graphs show that the correction value is in proportion to each of the display brightness and the ambient brightness. The higher the display brightness or the ambient brightness, the lower the saturation of color a user perceives. Therefore, the correction value for the saturation needs to be increased to compensate for the lowered saturation. For example, when a correction value y1 for the display brightness x1 and a correction value y2 for the ambient brightness x2 are given, the first correction value y may be calculated as follows.

$$y=W1*y1+W2*y2$$

W1 is a weight for the display brightness, and W2 is a weight for the ambient brightness. This equation is merely an example of various possible methods, and thus the method of calculating the first correction value is not limited to this embodiment. W1 and W2 may be set to have the same value of '1' or different values. Under an environment where there is little difference between the effect of the display brightness and the effect of the ambient brightness on the image, W1 and W2 may have a value of '1.' When the effect of the display brightness is greater than the effect of the ambient brightness, W1>W2 may be set. On the other hand, the effect of the ambient brightness is greater than the effect of the display brightness, W1<W2 may be set. The weight may be set variously in consideration of various environmental factors, and is therefore not limited to a specific numerical value.

The first correction value may be calculated based on not both the display brightness and the ambient brightness but either the display brightness or the ambient brightness. When the first correction value y is calculated based on the display brightness x1, y=W3*y1 may be satisfied (where, W3 is a weight, and y1 is a correction value corresponding to the display brightness x1). On the other hand, when the first correction value y is calculated based on the ambient brightness x2, y=W4*y2 may be satisfied (where, W4 is a weight, and y2 is a correction value corresponding to the ambient brightness x2). The weights W3 and W4 in both cases may have various numerical values.

Below, an example of the correction value varied depending on colors will be described.

Figure 7:
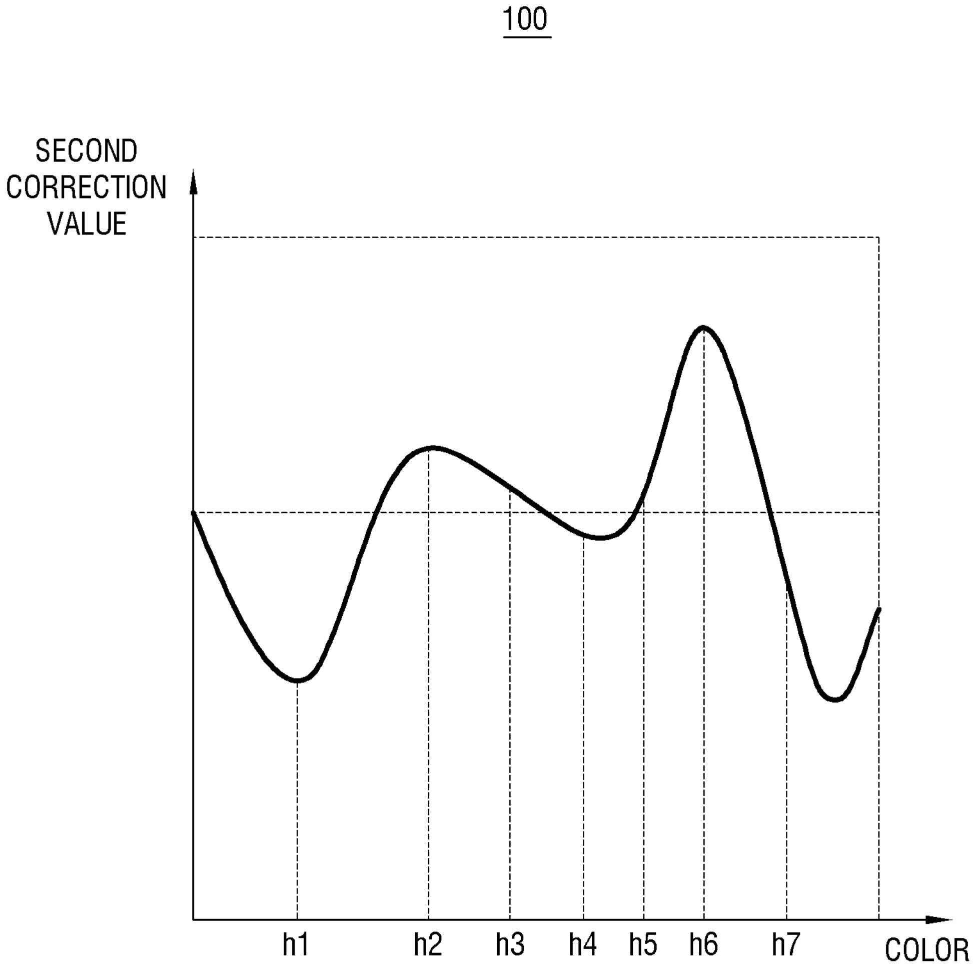
FIG. 7 is a graph showing a curve of correction values corresponding to colors.

FIG. 7 is a graph showing a curve of correction values corresponding to colors.

As shown in FIG. 7, the second correction value for the characteristic of the image may be calculated according to a plurality of colors. Human eyes have sensitivity varied depending on colors. For example, some users may be sensitive to red-based colors but relatively insensitive to green and blue-based colors. Alternatively, some users may be relatively sensitive to blue-based colors. Therefore, the second correction value may be varied depending on the colors rather than invariable for a plurality of colors, thereby accurately reflecting a user's perceptual characteristics.

When an input image signal has the saturation of $Chroma_{in}$, an output image signal has saturation of $Chroma_{out}$, and the second correction value of $Gain_{percept}$ is given for a user's perceptual characteristics, they satisfy the following relationships.

$$Chroma_{out}=Chroma_{in}*Gain_{percept}$$

$$Gain_{percept}=Gain_{panel}*Gain_{environ}*Gain_{hue}$$

Where, $Gain_{panel}$ is a saturation correction value for the display brightness, $Gain_{environ}$ is a saturation correction value for the ambient brightness, and $Gain_{hue}$ is a saturation correction value for the color. Here, a weight may be set to be reflected in each correction value of the equations.

As described above, the correction values for the plurality of colors may be derived based on results of a user's inputs for adjusting the test images. However, it is not practically easy to use the test images to derive the correction values for all the colors expressible through an image. Therefore, the electronic apparatus 100 may use various techniques based on the results of a user's input for the adjustment in order to derive correction values for colors about which a user's inputs for the adjustment are not made.

As an example, the electronic apparatus 100 may derive the correction values for the plurality of colors, for example, seven colors h1 to h7. When the colors h1 and h2 are taken into account, it is expected that a correction value for a predetermined color close to the color h1 is more similar to the correction value for the color h1 than the color h2. In this regard, various linear techniques may be used to derive correction values for colors between the colors h1 and h2 adjacent to each other in a color spectrum. In this way, the correction values for the colors between the colors h2 and h3, h3 and h4, h4 and h5, h5 and h6, and h6 and h7 are derived.

As an alternative example, the correction values for all the colors may be derived by a mathematical simulation prepared in advance or by artificial intelligence. For example, the correction values for the plurality of colors h1 to h7 based on the results of a user's input for adjusting the test image may be applied to at least one of artificial intelligence machine learning, neural network, or deep learning algorithm.

For example, the electronic apparatus 100 may function as a learner and a recognizer. The learner may perform a function of generating the trained neural network, and the recognizer may perform a function of recognizing (or inferring, predicting, estimating and identifying) the data based on the trained neural network. The learner may generate or update the neural network. The learner may obtain learning data to generate the neural network. For example, the learner may obtain the learning data from the storage of the electronic apparatus 100 or from the outside. The learning data may be data used for training the neural network, and the data subjected to the foregoing operations may be used as the learning data for training the neural network.

Before training the neural network based on the learning data, the learner may perform a preprocessing operation with regard to the obtained learning data or select data to be used in the training among a plurality of pieces of the learning data. For example, the learner may process the learning data to have a preset format, apply filtering to the learning data, or process the learning data to be suitable for the training by adding/removing noise to/from the learning data. The learner may use the preprocessed learning data for generating the neural network which is set to perform the operations.

The learned neural network may include a plurality of neural networks (or layers). The nodes of the plurality of neural networks have weighted values, and the plurality of neural networks may be connected to one another so that an output value of a certain neural network can be used as an input value of another neural network. As an example of the neural network, there are a convolutional neural network (CNN), a deep neural network (DNN), a recurrent neural network (RNN), a restricted Boltzmann machine (RBM), a deep belief network (DBN), a bidirectional recurrent deep neural network (BRDNN) and deep Q-networks.

The recognizer may obtain target data to carry out the foregoing operations. The target data may be obtained from the storage of the electronic apparatus 100 or from the outside. The target data may be data targeted to be recognized by the neural network. Before applying the target data to the trained neural network, the recognizer may perform a preprocessing operation with respect to the obtained target data, or select data to be used in recognition among a plurality of pieces of target data. For example, the recognizer may process the target data to have a preset format, apply filtering to the target data, or process the target data into data suitable for recognition by adding/removing noise. The recognizer may obtain an output value output from the neural network by applying the preprocessed target data to the neural network. Further, the recognizer may obtain a stochastic value or a reliability value together with the output value.

The display brightness, the ambient brightness, or the saturation correction values for the colors may be defined in advance, and various defining methods are possible. Below, some of various examples for preparing the saturation correction values in advance will be described.

Figure 8:
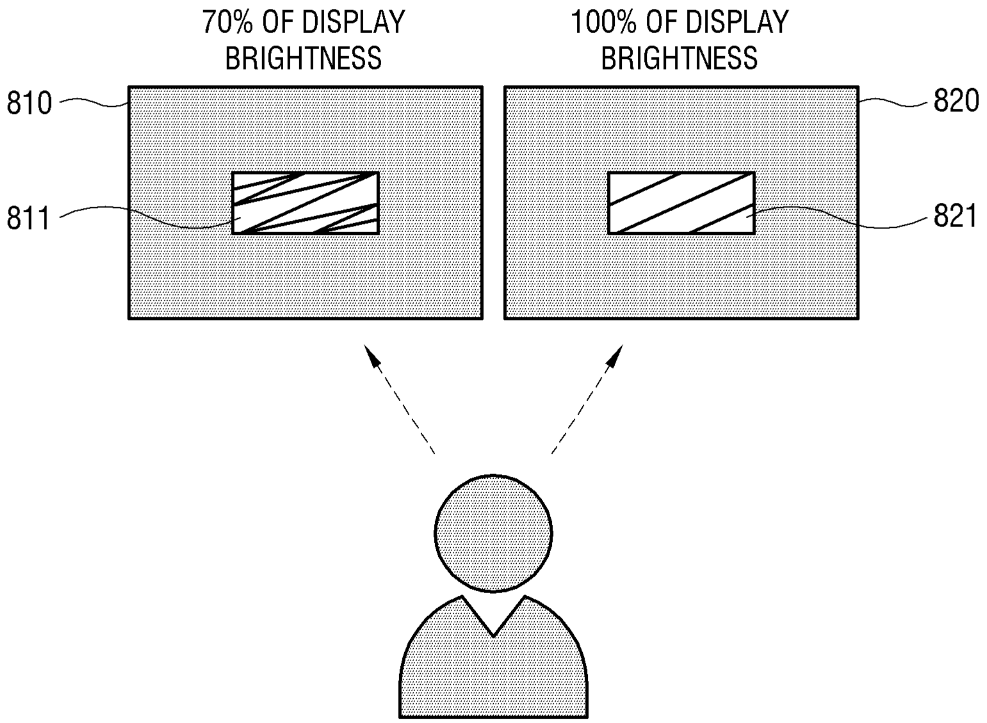
FIG. 8 is a diagram illustrating a principle of identifying a saturation correction value based on the brightness of a display through a perception experiment.

FIG. 8 illustrates a principle of identifying a saturation correction value based on display brightness through a perception experiment.

As shown in FIG. 8, the perception experiment for identifying the saturation correction value based on the display brightness may be performed in advance. In the foregoing embodiment related to FIG. 6, the saturation correction value based on the display brightness and the saturation correction value based on the ambient brightness are used to derive the first correction value. Below, the perception experiment for preparing the saturation correction value based on the display brightness will be described.

For example, two displays 810 and 820 having the same maximum brightness are provided, and images 811 and 821 having the same color are respectively displayed on the displays 810 and 820. One display 820 is set to display the image 821 with the maximum brightness, and the other display 810 is set to display the image 811 with brightness lower than the maximum brightness, for example, 70% of the maximum brightness. In this case, due to the color wash-out phenomenon, the saturation of the image 821 displayed on the display 820 with the maximum brightness is perceived to be low.

In this state, the display 810 set to 70% of the maximum brightness maintains the saturation, but the saturation of the image 821 displayed on the display 820 set to the maximum brightness is increased step by step and provided to test subjects. Here, the test subjects are asked to select the image 821 displayed on the display 820 with the maximum brightness, of which the saturation seems the most similar to the saturation of the image 811 displayed on the display 810 with 70% brightness. The above experiment is performed while changing the brightness of the displays 810 and 820, and thus experimental data is accumulated.

Based on the accumulated experimental data, the correction value may be derived to prevent the color wash-out phenomenon that may occur according to the display brightness.

Besides the foregoing method, a color appearance model (CAM) may be used to derive the correction value. The CAM refers to an equation-based model developed as a method of quantifying a perceived color. By this model, it is possible to identify the saturation perceived according to the brightness, and inversely calculate the amount of saturation that decreases as the brightness increases.

In the case of using the CIELAB model, a saturation correction value $S_{ab}$ is as follows.

$$S_{ab}=[C^*/(\sqrt{(C^{*2}+L^{*2})})](100\%),\ C^*=\sqrt{(a^{*2}+b^{*2})}$$

Where, L* is lightness of a CIELAB coordinate, and b* are color coordinates of CIELAB (a*: green to red, b*: blue to yellow), and C* is chromaticity of CIELAB (from a* and b*).

When a 1,000 nit (1 Knit) display and a 500 nit display are given, a color correction value of k at which the 1,000 nit display has the same saturation as the 500 nit display may be calculated as follows.

$$Sat_{1k}=C_{1k}/(\sqrt{(C_{1k}^2+L_{1k}^2)}),\ Sat_{500}=C_{500}/(\sqrt{(C_{500}^2+L_{500}^2)})$$

$$Sat_{1k\_new}=kC_{1k}/(\sqrt{(k^2C_{1k}^2+L_{1k}^2)})=Sat_{500}$$

$$k=(C_{500}L_{1k})/(L_{500}C_{1k})$$

The correction value k may be obtained for each pixel value. The foregoing method is merely an example of various methods of deriving the correction value based on the equations.

Figure 9:
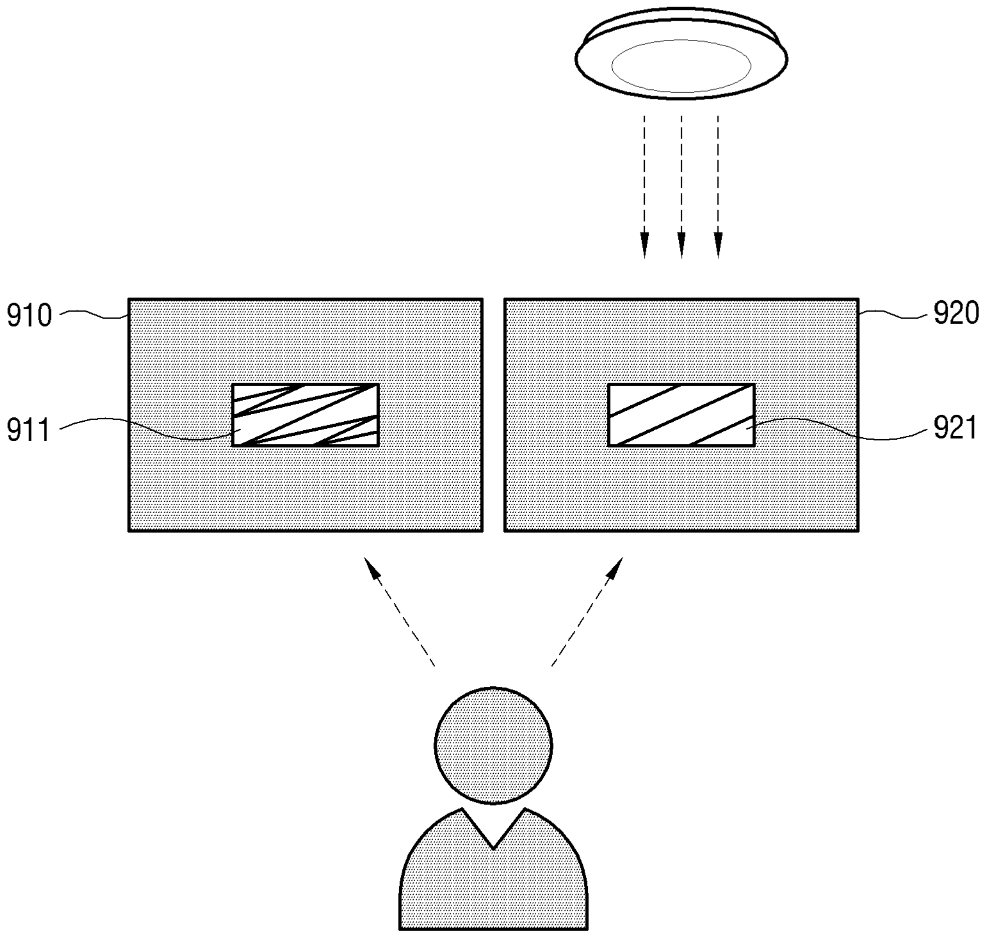
FIG. 9 is a diagram illustrating a principle of identifying a saturation correction value based on ambient brightness through a perception experiment.

FIG. 9 illustrates a principle of identifying a saturation correction value based on ambient brightness through a perception experiment.

As shown in FIG. 9, the perception experiment for identifying the saturation correction value based on the ambient brightness may be performed in advance. In the foregoing embodiment related to FIG. 6, the saturation correction value based on the display brightness and the saturation correction value based on the ambient brightness are used to derive the first correction value. Below, the perception experiment for preparing the saturation correction value based on the ambient brightness will be described.

For example, two displays 910 and 920 having the same maximum brightness are provided, and images 911 and 921 having the same color are respectively displayed on the displays 910 and 920. One display 910 is set to display the image 911 under a darkroom environment, and the other display 920 is set to display the image 911 under an environment where the ambient brightness is increased by turning on a light or the like. In this case, due to the color wash-out phenomenon, the saturation of the image 921 displayed on the display 920 is perceived to be low.

In this state, the saturation of the image 921 displayed on the display 920 under a surrounding environment where the ambient brightness is relatively high is increased step by step and provided to test subjects. Here, the test subjects are asked to select the image 921 displayed on the display 920 with the relatively high ambient brightness, of which the saturation seems the most similar to the saturation of the image 911 displayed on the display 910 under the relatively low ambient brightness. The above experiment is performed while changing the ambient brightness, and thus experimental data is accumulated.

Based on the accumulated experimental data, the correction value may be derived to prevent the color wash-out phenomenon that may occur according to the ambient brightness.

The saturation correction value for each color may also be prepared through the perception experiment. A degree to which change in the display brightness and the ambient brightness causes a user to perceive the color differently is varied depending on the colors. Typically, a degree of color perceptual distortion is greater in a neutral color than a degree of color perceptual distortion in a primary color. To reflect this tendency in the correction value, the saturation correction value varied depending on the colors may be identified through the tests performed for each color, while carrying out the perception experiment related to the display brightness and the perception experiment related to the ambient brightness.

Below, an example of testing a user's perceptual characteristics test will be described.

Figure 10:
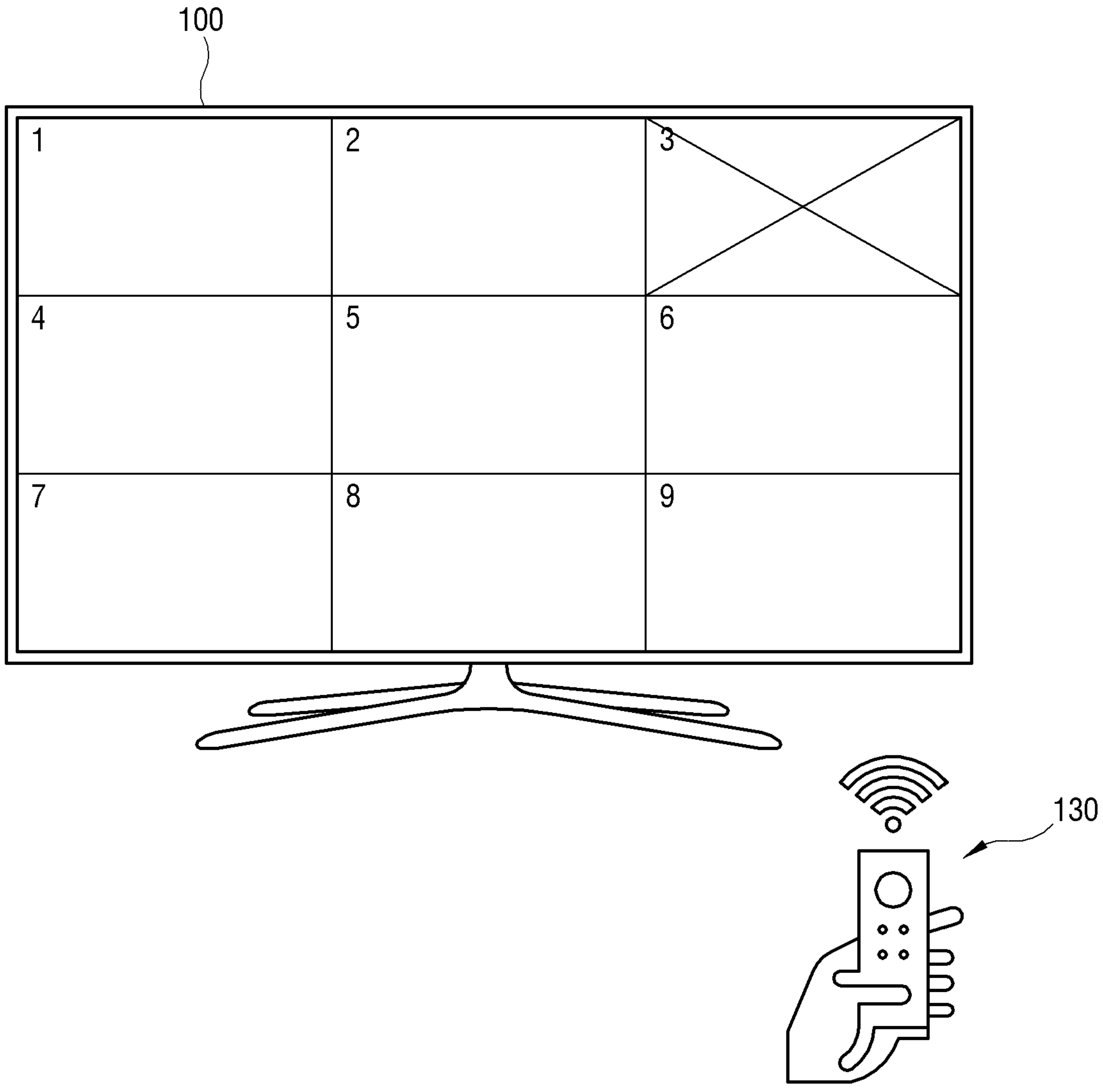
FIG. 10 is a diagram illustrating an electronic apparatus performing a test for a user's perceptual characteristics.

FIG. 10 illustrates that an electronic apparatus performing a test for a user's perceptual characteristics according to an embodiment.

As shown in FIG. 10, the electronic apparatus 100 performs a test for identifying a user's personal perceptual characteristics, for example, perceptual characteristics to saturation for each color of an image. When the test is performed, the electronic apparatus 100 uses a test image in which an identified first correction value $Gain_{percept}$ is reflected with respect to a predefined default value. The first correction value $Gain_{percept}$ is the same as the first correction value described in the foregoing embodiment (see the embodiment with reference to FIG. 5). The electronic apparatus 100 converts signal values $R_{in}$, $G_{in}$, $B_{in}$ of the test image into YCbCr signals $Y_{in}$, $Cb_{in}$, $Cr_{in}$, and calculates $Cb_{out}$ and $Cr_{out}$ by applying the first correction value $Gain_{percept}$ to the CbCr signal. The electronic apparatus 100 obtains brightness information $Y_{out}$ by applying the correction value $Gain_{compress}$ of the brightness for saturation compensation to $Y_{in}$, thereby generating a YCbCr output signal in which the saturation perceived according to the display environment is corrected. The electronic apparatus 100 converts the YCbCr output signal into an RGB signal, thereby obtaining final test image signals $R_{test}$, $G_{test}$ and $B_{test}$. The above descriptions are expressed as the following equations.

$$(Y_{in}, Cb_{in}, Cr_{in})=RGBtoYCbCr(R_{in}, G_{in}, B_{in})$$

$$Y_{out}=Y_{in}*\mathrm{Gain}_{compress}$$

$$Cb_{out}=Cb_{in}*\mathrm{Gain}_{percept}$$

$$Cr_{out}=Cr_{in}*\mathrm{Gain}_{percept}$$

$$(R_{test}, G_{test}, B_{test})=YCbCrtoRGB(Y_{out}, Cb_{out}, Cr_{out})$$

In the foregoing equations, RGBtoYCbCr is a function that converts the RGB signal into the YCbCr signal, and YCbCrtoRGB is a function that converts the YCbCr signal into the RGB signal.

The electronic apparatus 100 displays the test image generated as above on a screen. For example, the electronic apparatus 100 displays the test image having the same color on a nine-split screen, in which the saturation of the color in one split area (e.g., the area No. 3 in FIG. 10) is different from those in the other split areas. The electronic apparatus 100 asks a user to select a split area perceived differently through the user input 130 in the test image displayed as above. For example, when the screen is split into nine areas, the split areas are numbered from '1' to '9'. When the user perceives that the saturation in the area No. 3 area is different, the user presses '3' among number buttons provided in the user input 130. On the other hand, when a user perceives that the saturation in all the split areas is the same, the user presses '0' among the number buttons of the user input 130. In addition to the user input method described above, various user input methods may be provided.

When a user's selection received through the user input 130 is correct, the electronic apparatus 100 adds up a score for the corresponding color. The electronic apparatus 100 repeats such a test several times while adjusting the saturation differently and changing the position of the split area having different saturation.

The electronic apparatus 100 performs the foregoing test for several predefined colors, thereby obtaining a user's perception score for each of the plurality of colors.

An HSV color domain may be used to make a test image set $Test_{set}$ for testing a user's perceptual characteristics. To make the set for various colors, the color may be divided into equal parts at regular intervals. For example, when the color is divided into six equal parts, a set $Hue_{set}$ of representative colors is as follows.

$$\mathrm{Hue}_{set}=\{0°, 60°, 120°, 180°, 240°, 300°\}$$

When the saturation and the value for the test image are too small or too large, perceptual discrimination may be lowered. For example, a median of '0.5' may be used. To increase the number of test steps, the saturation and the value for the test image varied depending on the colors may also be used. When '0.5' is used as the corresponding values, a final test image set may be expressed as follows.

$$\mathrm{Test}_{set}=\{(H_1, S_1, V_1=0°, 0.5, 0.5), (H_2, S_2, V_2=60°, 0.5, 0.5), \ldots (H_6, S_6, V_6=300°, 0.5, 0.5)\}$$

Regarding such six representative colors, the electronic apparatus 100 performs a test for perceptual characteristics as described above. The electronic apparatus 100 splits the screen into nine areas, in which the test image based on the $Test_{set}$ is displayed on eight split areas and the test image adjusted by reflecting an offset value in the saturation is displayed on the other one split area. Regarding the colors in the $Test_{set}$, several tests are performed, while gradually decreasing the offset intensity of the saturation to test a user's perceptual ability.

A user is given a discrimination score when making correct selection in the test. This score may for example be given in inverse proportion to an offset size of the saturation. The smaller the offset size, the closer the saturation of the split area a user needs to discriminate to that of other split areas. Therefore, a user is given a higher discrimination score when making correct section. In this way, a user's perceptual characteristics are tested for each color of the $Test_{set}$, and the electronic apparatus 100 acquires the $Score_{set}$ for discrimination according to the colors.

The electronic apparatus 100 performs color correction suitable for a user's perceptual characteristics based on the acquired $Score_{set}$. The electronic apparatus 100 searches the $Score_{set}$ for the color $Hue_{min}$ at which a user's color discrimination is relatively low and then calculates $Score_{left}$ obtained by adding up the discrimination scores of the colors on the left side with respect to the $Hue_{min}$ and $Score_{right}$ obtained by adding up the discrimination scores of the colors on the right side. When adding up the scores, the electronic apparatus 100 may give a higher weight to colors, which are closer to the $Hue_{min}$, among the colors on the same side, thereby increasing the effect of those colors on the discrimination score. The electronic apparatus 100 uses a larger value $Score_{max}$ between the calculated $Score_{left}$ and $Score_{right}$ to finally calculate a color correction value $Hue_{percept}$ for a user's perception.

$$\mathrm{Hue}_{percept}=\mathrm{Hue}_{offset}, \text{ if } \mathrm{Score}_{left}<\mathrm{Score}_{right}$$

$$\mathrm{Hue}_{percept}=-\mathrm{Hue}_{offset}, \text{ if } \mathrm{Score}_{left}>\mathrm{Score}_{right}$$

$Hue_{offset}$ is varied in proportion to $Score_{max}$. In the operation 530 of secondarily adjusting the color (see FIG. 5), the $Hue_{percept}$ is used to perform color correction for the colors within a color range of the $Hue_{min}$ among the colors $Hue_{in}$ of the input image signal as follows.

$$\mathrm{Hue}_{out}=\mathrm{Hue}_{in}+\mathrm{Hue}_{percept}$$

In this method, the electronic apparatus 100 may convert an input image signal into an output image signal by reflecting a user's perceptual characteristics, for example, perceptual ability to the saturation for each color. This method is merely an example among various methods by which the electronic apparatus 100 reflects a user's perceptual characteristics in the image signal, and therefore this embodiment does not limit the operations of the electronic apparatus 100 according to the disclosure.

For example, the electronic apparatus 100 displays a user interface (UI) through which a user can directly input a saturation correction value for each color, and receives an input through the UI. This UI may be prepared to input the saturation as a numerical value, or may include an adjustment menu in the form of a slide bar for adjusting the saturation.

The foregoing embodiment relates to a case where the electronic apparatus 100 identifies one user and considers the perceptual characteristics of the identified user. However, there may be several users who use the electronic apparatus 100, and the user may be changed according to point in time when the electronic apparatus 100 is used. In this regard, the electronic apparatus 100 manages a correction value for each user with respect to an image perceiving characteristic, and such an embodiment will be described below.

Figure 11:
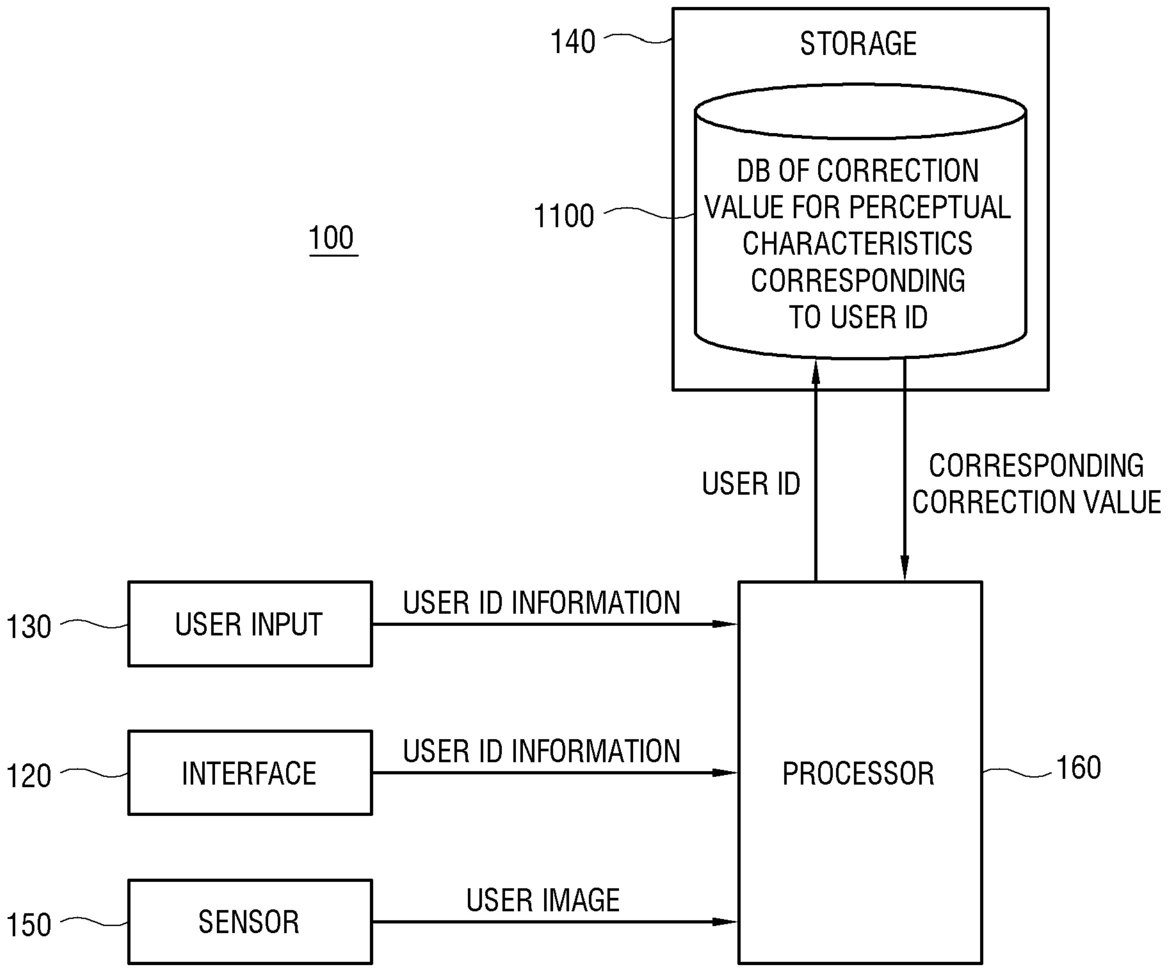
FIG. 11 is a block diagram showing a principle that an electronic apparatus manages and applies a correction value for each user with respect to an image perceiving characteristic according to an embodiment.

FIG. 11 is a block diagram showing a principle that an electronic apparatus manages and applies a correction value for each user with respect to an image perceiving characteristic according to an embodiment.

As shown in FIG. 11, the processor 160 of the electronic apparatus 100 may store the correction value corresponding to a user's predetermined perceptual characteristic in the storage 140, in which the correction values corresponding to a plurality of users are stored and constructed as a database (DB) 1100. When a user is identified and the correction value is derived corresponding to the identified user's perceptual characteristic, the electronic apparatus 100 stores the derived correction value in the DB 1100 in accordance with that user's identified ID. The method of deriving the correction value has been described in the foregoing embodiment, and thus detailed descriptions thereof will be omitted.

There are a plurality of methods by which the processor 160 identifies users, and it is not limited to any one of the method. For example, the processor 160 receives user ID information input by a user through the user input 130 to log in, and identifies that user when the login is successful. Alternatively, the processor 160 may receive the user ID information through the interface 120. Alternatively, the processor 160 may receive an image of a user from the sensor 150 implemented as a camera, and identify user ID in the image through image analysis.

The processor 160 searches the DB 1100 for the correction value corresponding to the identified user ID. When the correction value corresponding to the user ID is not found in the DB 1100, the processor 160 may test a user's perceptual characteristics as described in the foregoing embodiments. When the correction value corresponding to the user ID is found in the DB 1100, the processor 160 displays an image reflecting the found correction value.

There may be a difference in environment between a first point in time when the correction value is derived considering a user's perceptual characteristics and a second point in time when an image is displayed reflecting the correction value. In other words, the first point in time and the second point in time may be different in the display brightness or the ambient brightness. For example, when an indoor light is replaced by a brighter one after the first point in time, an image is displayed at the second point in time under an environment where the ambient brightness is more increased than the ambient brightness at the first point in time. Taking this difference into account, the electronic apparatus 100 may additionally adjust the correction value, and such an embodiment will be described below.

Figure 12:
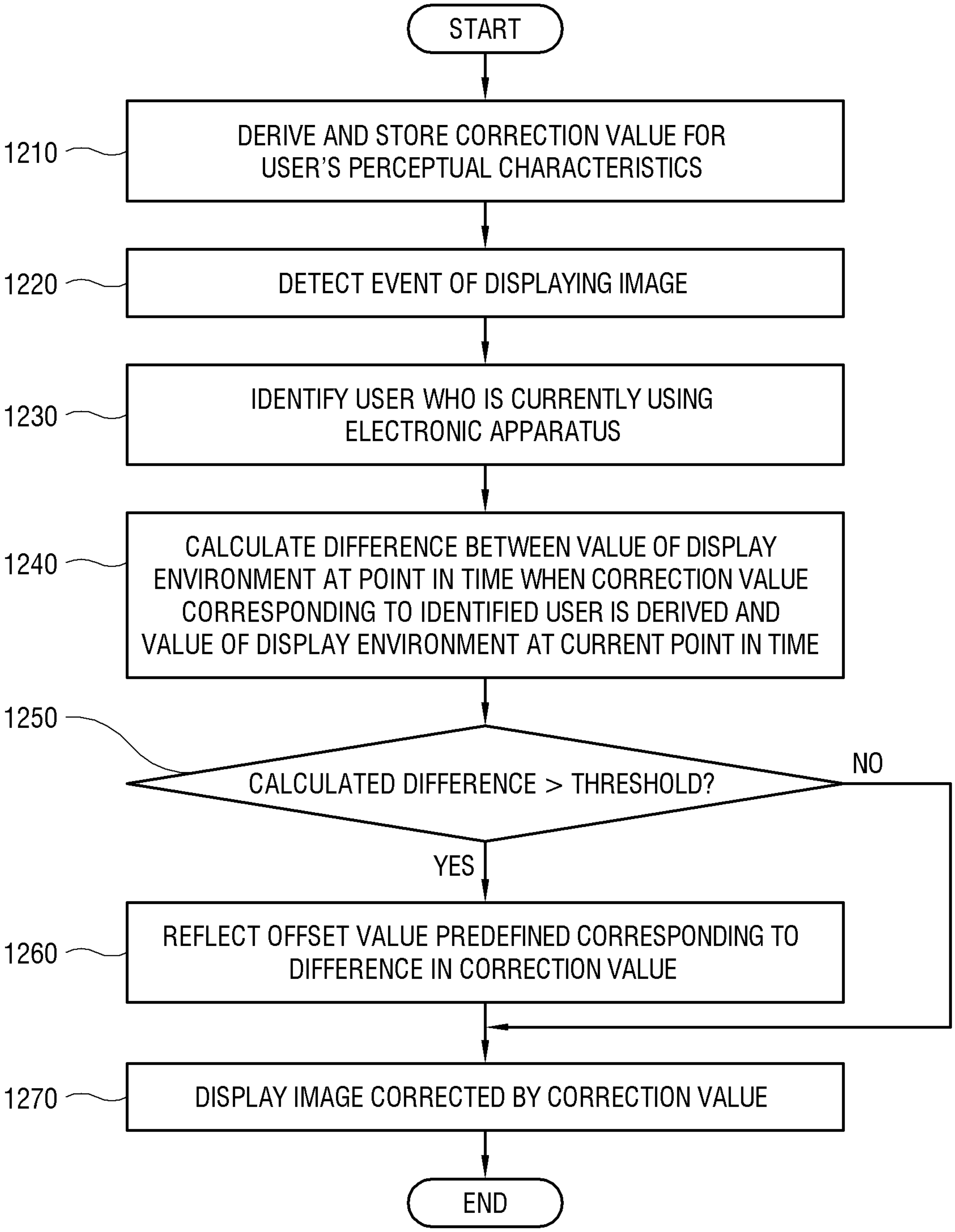
FIG. 12 is a flowchart showing a process in which an electronic apparatus adjusts a correction value based on environmental change according to an embodiment.

FIG. 12 is a flowchart showing a process in which an electronic apparatus adjusts a correction value based on environmental change according to an embodiment.

As shown in FIG. 12, the following operations are performed by the processor 160 (see FIG. 2) of the electronic apparatus.

In operation 1210, the electronic apparatus derives and stores the correction value for a user's perceptual characteristic. A method of deriving the correction value is the same as that described in the foregoing embodiments.

In operation 1220, the electronic apparatus detects an event of displaying an image.

In operation 1230 the electronic apparatus identifies a user who is currently using the electronic apparatus.

In operation 1240 the electronic apparatus calculates a difference between a value of a display environment at a point in time when a correction value corresponding to the identified user is derived and a value of a display environment at a current point in time. For example, the electronic apparatus calculates a difference in the display brightness between the point in time when the correction value is derived and the current point in time, and a difference in the ambient brightness between the point in time when the correction value is derived and the current point in time.

In operation 1250, the electronic apparatus identifies whether the calculated difference is greater than a threshold.

When it is identified that the calculated difference is greater than the threshold ("Yes" in the operation 1250), at operation 1260 the electronic apparatus reflects an offset value, which has previously defined corresponding to the calculated difference, in the correction value. The offset value may be defined in advance by experiments, simulations, etc., or may be set according to a function or equation. For example, when the difference in the display brightness does not exceed a predetermined first threshold but the difference in the ambient brightness exceeds a predetermined second threshold, the electronic apparatus may reflect an offset value corresponding to the difference in the ambient brightness in the correction value.

In operation 1270 the electronic apparatus displays an image corrected by using the correction value.

On the other hand, when it is identified that the calculated difference is not greater than the threshold ("No" in the operation 1250), the electronic apparatus enters the operation 1270. The difference not greater than the threshold means that there is a difference between two display environments but the difference is not large enough to be significant.

The operations of the apparatus described above in the foregoing embodiments may be performed by artificial intelligence installed in the apparatus. The artificial intelligence may be applied to various systems based on machine learning algorithms. The artificial intelligence system refers to a computer system that implements human-level intelligence or near human-level intelligence, in which a machine, device or system autonomously learns and makes a decision, and a recognition rate and a decision accuracy are improved based on accumulated use experiences. Artificial intelligence technology is based on elementary technology by utilizing machine learning technology and algorithms using an algorithm of autonomously classifying/learning features of input data to copy perception, determination and the like functions of a human brain.

The elementary technology may for example include at least one of linguistic comprehension technology for recognizing a language/text of a human, visual understanding technology for recognizing an object like a human sense of vision, deduction/prediction technology for identifying information and logically making deduction and prediction, knowledge representation technology for processing experience information of a human into knowledge data, and motion control technology for controlling a vehicle's automatic driving or a robot's motion.

Here, the linguistic comprehension refers to technology of recognizing and applying and processing a human's language or character, and includes natural language processing, machine translation, conversation system, question and answer, speech recognition and synthesis, etc.

The deduction/prediction refers to technology of identifying information and logically making prediction, and includes knowledge and possibility-based deduction, optimized prediction, preference-based plan, recommendation, etc.

The knowledge representation refers to technology of automating a human's experience information into knowledge data, and includes knowledge building such as data creation and classification, knowledge management such as data utilization, etc.

The methods according to the foregoing embodiments may be implemented in the form of a program instruction that can be implemented in various computers, and recorded in a computer readable medium. Such a computer readable medium may include a program instruction, a data file, a data structure or the like, or combination thereof. For example, the computer readable medium may be stored in a nonvolatile storage unit such as universal serial bus (USB) memory, regardless of whether it is deletable or rewritable, for example, a RAM, a ROM, a flash memory, a memory chip, an integrated circuit (IC) or the like memory, or an optically or magnetically recordable or machine (e.g., a computer)-readable storage unit medium, for example, a compact disk (CD), a digital versatile disk (DVD), a magnetic disk, a magnetic tape or the like. It will be appreciated that a memory, which can be included in a mobile terminal, is an example of the machine-readable storage unit medium suitable for storing a program having instructions for realizing the embodiments. The program instruction recorded in this storage unit medium may be specially designed and configured according to the embodiments, or may be publicly known and available to those skilled in the art of computer software. Further, the computer program instruction may be implemented by a computer program product. The computer-readable medium may be provided in the form of a non-transitory storage medium. The term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

Embodiments of the disclosure disclosed in the specification and the drawings are only specific examples given to easily describe technical contents according to embodiments of the disclosure and to help understanding of embodiments of the disclosure, and are not intended to limit the scope of embodiments of the disclosure. Therefore, the scope of various embodiments of the disclosure are to be interpreted as encompassing all changed or modified forms derived based on technical ideas of various embodiments of the disclosure, in addition to the embodiments disclosed herein.

What is claimed is:

1. An electronic apparatus comprising:

a display;

an interface configured to receive an image signal;

a memory storing instructions; and a processor configured to execute the instructions to:

identify a display environment of an image, wherein the display environment includes display brightness of the display or ambient brightness of a surrounding environment of the electronic apparatus, correct characteristics of a test image provided to identify a visual perception of a user for characteristics of the image to correspond to the identified display environment, wherein the processor is configured to correct the characteristics of the test image to correspond to the display brightness or the ambient brightness, display the test image having the corrected characteristics on the display, receive an input of the user for adjusting the characteristics of the displayed test image, and correct the characteristics of the image based on the received input of the user for adjusting the characteristics of the displayed test image, wherein the processor is further configured to execute the instructions to:

identify a first correction value in proportion to the display brightness or the ambient brightness, and reflect the first correction value in a value of the characteristics of the test image, correct the characteristics of the image by reflecting the first correction value and a second correction value corresponding to the input of the user for adjusting the characteristics of the displayed test image in color information of the image signal received through the interface, and reflect a third correction value which is in inverse proportion to the first correction value in brightness information of the image signal received through the interface.

2. The electronic apparatus of claim 1, wherein the processor is further configured to execute the instructions to correct saturation for each color of the test image.

3. The electronic apparatus of claim 1, wherein the processor is further configured to execute the instructions to determine the first correction value based on a correction value corresponding to the display brightness and a correction value corresponding to the ambient brightness.

4. The electronic apparatus of claim 3, wherein the processor is further configured to execute the instructions to determine the first correction value based on a first weight given to the correction value corresponding to the display brightness and a second weight given to the correction value corresponding to the ambient brightness, the first weight being different from the second weight.

5. The electronic apparatus of claim 1, wherein the processor is further configured to execute the instructions to identify a correction value based on the input of the user for adjusting the characteristics of the displayed test image and correct the characteristics of the image by reflecting the correction value in the color information of the image signal received through the interface.

6. The electronic apparatus of claim 5, wherein the processor is further configured to execute the instructions to measure a user score for a color based on whether an area different in saturation is correctly selected by the input of the user for adjusting the characteristics of the displayed test image, and derive the correction value based on the measured score.

7. The electronic apparatus of claim 1, wherein the memory is configured to store a correction value corresponding to the user, and wherein the processor is further configured to acquire the correction value stored in the memory and adjust the correction value based on a difference between the display environment at a point in time in which the correction value is derived and the display environment at a current point in time.

8. A method of controlling an electronic apparatus, the method comprising:

identifying a display environment of an image, wherein the display environment includes display brightness of a display of the electronic apparatus or ambient brightness of a surrounding environment of the electronic apparatus;

correcting characteristics of a test image provided to identify a visual perception of a user for characteristics of the image to correspond to the identified display environment, wherein the correcting of the characteristics of the test image comprises correcting the characteristics of the test image to correspond to the display brightness or the ambient brightness;

displaying the test image having the corrected characteristics on the display;

receiving, through a touch screen of the display, an input of the user for adjusting the characteristics of the displayed test image, the input for adjusting the corrected characteristics of the displayed test image being an adjustment input of the user on the touch screen;

correcting the characteristics of the image based on the received input of the user for adjusting the characteristics of the displayed test image; and receiving an image signal through an interface of the electronic apparatus, wherein the correcting the characteristics of the test image comprises:

identifying a first correction value in proportion to the display brightness or the ambient brightness, and reflecting the first correction value in a value of the characteristics of the test image, wherein the correcting the characteristics of the image based on the received input of the user comprises:

correcting the characteristics of the image by reflecting the first correction value and a second correction value corresponding to the input of the user for adjusting the characteristics of the displayed test image in color information of the image signal received through the interface, and wherein the method further comprises:

reflecting a third correction value which is in inverse proportion to the first correction value in brightness information of the image signal received through the interface.

9. The method of claim 8, wherein the correcting the characteristics of the test image comprises correcting saturation for each color of the test image.

10. The method of claim 8, wherein the identifying the first correction value comprises determining the first correction value based on a correction value corresponding to the display brightness and a correction value corresponding to the ambient brightness.

11. The method of claim 10, wherein the determining the first correction value comprises determining the first correction value based on a first weight given to the correction value corresponding to the display brightness and a second weight given to the correction value corresponding to the ambient brightness, the first weight being different from the second weight.

12. The method of claim 8, wherein the correcting the characteristics of the image based on the input of the user for adjusting the characteristics of the displayed test image comprises:

obtaining the color information of the image signal;

identifying the second correction value based on the input of the user for adjusting the characteristics of the displayed test image; and adjusting the color information of the image signal based on the first correction value and the second correction value.

13. The method of claim 8, wherein the correcting the characteristics of the image based on the input of the user for adjusting the characteristics of the displayed test image comprises:

identifying the second correction value based on the input of the user for adjusting the characteristics of the displayed test image.

14. A non-transitory computer-readable recording medium having recorded thereon a program that is executable by a computer to perform the method of claim 8.

* * * * *